Patented Jan. 14, 1930

1,743,615

UNITED STATES PATENT OFFICE

JOHN H. NEAD, EARL R. WEHR, AND CARL C. MAHLIE, OF MIDDLETOWN, OHIO, ASSIGNORS TO THE AMERICAN ROLLING MILL COMPANY, OF MIDDLETOWN, OHIO, A CORPORATION OF OHIO

SOLDERING PROCESS

No Drawing. Application filed February 25, 1927. Serial No. 171,067.

Our invention relates to the soldering of metal sheets together, or metal pieces of other types, and relates specifically to a process of soldering metal of ferrous nature, or other nature which has been surface coated with an alloy of zinc and aluminum.

We are aware that the art has been concerned to a considerable extent with the problem of properly joining pieces of aluminum together, and are familiar with the processes involved, which require, in order to be as effective as possible, considerable in the way of treatment and cleaning to remove the oxide of aluminum or alumina, which prevents the proper bond between the pieces of metal and a welding or soldering metal.

Our invention, being concerned with surface coatings only, and in which coating the aluminum is not above say seven to ten per cent, although it may be higher, requires a different mode of treatment.

It is our object to use the ordinary soldering compounds, such as are used for the soldering of galvanized sheet metal plates in the soldering of plates coated with an alloy of zinc and aluminum.

It is our object to treat the product to be soldered either at the zone where the bond is to take place, or completely, if convenient, with a substance which renders the zinc-aluminum coating solderable in the same manner as an ordinary spelter or zinc coating.

We employ for this purpose an alkaline solution, the concentration of which is not a critical factor. For example, we find that a 10 to 25% solution of sodium or potassium hydroxide will result in an altering of the zinc-aluminum alloy surface of coated metal pieces, which permits of the successful use of regular soldering practice. Other proportions, however, will serve, say one to fifty per cent.

In applying our invention, we treat the edges of pieces which are to be soldered, throughout the soldering zone, or treat the entire sheet or article, with the solutions noted or some like alkaline solution which has like reactions with oxide of zinc and aluminum.

In one practice we employ a 20% solution of sodium hydroxide and apply it by means of a suitable swab to the areas to be soldered. The soldering then proceeds in the usual manner, as followed with the use of fluxing agents in the usual practice of soldering, using the same tools, and the same type of soldier as is used in soldering zinc spelter galvanized sheets and metal products. Other types of solder of higher or lower melting points may also be used successfully.

Another practice, and a preferred one, which gives better results, is to swab the soldering zone with, or dip the entire sheet or article into a bath of the alkaline or lye solution, and then promptly wash or scrub the article so as to remove the products of whatever reaction takes place. One great advantage of this treatment is that for a period of some weeks, at least, its effects remain, and perfect soldering as used for galvanized sheets can be practiced at any time during said period. Sheets coated with the alloy can be given the treatment at the factory before shipment, and can be handled by workmen used to handling galvanized sheets without further instructions.

It is our present belief that the treatment leaves a surface film of zinc coating without aluminum, but this may not be the case. At any rate the lye washed and cleansed product possesses novel properties over the untreated material.

Of course, the alloy coated sheets may also be swabbed with the lye, and then swabbed off with water, just before soldering if this is desired.

The use of the term zinc and aluminum alloy or like words are not intended as words of exclusion in this specification and the claims that follow. The point of our invention is the avoidance of soldering difficulty due to presence of aluminum.

Having thus described our invention, what we claim as new and desire to secure by Letters Patent, is:—

1. The process for soldering metal articles having a coating of zinc-aluminum alloy, in which the aluminum is above ½ of 1%, which consists in applying a solution of strongly alkaline nature to the surfaces to be soldered, preparatory to soldering and without heating the said surfaces and then applying flux and solder in the usual manner.

2. The process for soldering metal articles formed with a coating containing proportions of aluminum sufficient to impede soldering due to the presence of aluminum oxide, which consists in treating the articles, without heating them, with an alkaline solution which attacks the aluminum products, preparatory to soldering, said alkaline solution formed of a strongly basic hydroxide and water and then applying flux and solder in the usual manner.

3. The process for soldering metal articles having a coating of zinc aluminum alloy, in which the aluminum is above .5%, which consists in applying a water solution of an alkaline hydroxide, in strength of between approximately 1 to 50%, to the surfaces to be soldered, preparatory to soldering the said surfaces being unheated, said hydroxide being sodium or potassium hydroxide and then applying flux and solder in the usual manner.

4. The process for soldering articles having a coating of zinc-aluminum alloy, which consists in treating the coating without heating to an oxidizing temperature, with an alkaline solution of sufficient strength to attack the coating, and then washing off the products of reaction and any excess alkali before soldering and then applying flux and solder in the usual manner.

5. The process for soldering articles having a coating of zinc-aluminum alloy, which consists in treating the coating cold with an alkaline hydroxide of sufficient strength to attack the coating, and then washing off the products of reaction and any excess alkali before soldering and then applying flux and solder in the usual manner.

6. The process for soldering articles having a coating of zinc-aluminum alloy, which consists in treating the coating without heating it to an oxidizing temperature with a lye solution of sufficient strength to attack the coating, and then washing off the products of reaction and any excess alkali before soldering and then applying flux and solder in the usual manner.

7. The process for soldering articles having a coating of zinc-aluminum alloy, which consists in treating the coating cold with an alkaline solution of sufficient strength to attack the coating, and then washing off the products of reaction and any excess alkali before soldering, and then adding flux and soldering in the usual manner for zinc.

JOHN H. NEAD.
EARL R. WEHR.
CARL C. MAHLIE.